(12) United States Patent
Agrawal et al.

(10) Patent No.: US 12,430,141 B2
(45) Date of Patent: Sep. 30, 2025

(54) INTEGRATED APPLICATION PERFORMANCE AND INFRASTRUCTURE MANAGEMENT

(71) Applicant: Rakuten Mobile, Inc., Tokyo (JP)

(72) Inventors: Amit Agrawal, Tokyo (JP); Varun Manoharan, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 18/248,054

(22) PCT Filed: Dec. 29, 2022

(86) PCT No.: PCT/US2022/054233
§ 371 (c)(1),
(2) Date: Apr. 6, 2023

(87) PCT Pub. No.: WO2024/144780
PCT Pub. Date: Jul. 4, 2024

(65) Prior Publication Data
US 2025/0085981 A1    Mar. 13, 2025

(51) Int. Cl.
*G06F 9/445*       (2018.01)
*G06F 11/30*      (2006.01)
*G06F 11/34*      (2006.01)

(52) U.S. Cl.
CPC ........ *G06F 9/44505* (2013.01); *G06F 11/302* (2013.01); *G06F 11/3409* (2013.01)

(58) Field of Classification Search
CPC . G06F 9/44505; G06F 11/302; G06F 11/3409
See application file for complete search history.

(56) References Cited

U.S. PATENT DOCUMENTS

| | | | |
|---|---|---|---|
| 8,683,370 B2 * | 3/2014 | Marchand | G06Q 10/067 707/802 |
| 8,892,931 B2 * | 11/2014 | Kruglick | G06F 1/3203 713/340 |
| 9,118,520 B1 * | 8/2015 | Mao | G06F 1/324 |
| 9,465,711 B2 * | 10/2016 | Kukoyi | G06F 11/3428 |
| 9,495,139 B2 * | 11/2016 | Stitt | G06F 17/17 |
| 9,678,771 B2 * | 6/2017 | Singleton, IV | G06F 9/5077 |

(Continued)

*Primary Examiner* — Aurel Prifti
(74) *Attorney, Agent, or Firm* — HAUPTMAN HAM, LLP

(57) ABSTRACT

Integrated application performance and infrastructure management is described. Performance of an application and utilization of provisioned infrastructure for supporting the application are proactively monitored. A determination is made that the application is not performing according to application dimensioning information or the provisioned infrastructure is being over utilized. In response to determining the provisioned infrastructure is being over utilized, an adjustment to the provisioned infrastructure to prevent over utilization is initiated. In response to determining the application is not performing according to the application dimensioning information, an alert indicating the application is not performing according to the application dimensioning information is generated. In response to the alert, the application dimensioning information is updated or the application is adjusted to perform according to the application dimensioning information.

20 Claims, 5 Drawing Sheets

(56) References Cited

U.S. PATENT DOCUMENTS

| | | | | |
|---|---|---|---|---|
| 9,690,685 B2* | 6/2017 | Vyas | | G06F 11/3024 |
| 10,139,895 B2* | 11/2018 | Browning | | G06F 1/3296 |
| 10,423,398 B1* | 9/2019 | Marr | | G06F 8/65 |
| 11,163,350 B2* | 11/2021 | Tsirkin | | G06F 1/3206 |
| 11,188,348 B2* | 11/2021 | Chikin | | G06F 11/3447 |
| 11,294,788 B2* | 4/2022 | Perez | | G06F 11/3485 |
| 11,687,335 B2* | 6/2023 | Ignatyev | | G06F 8/71 |
| | | | | 717/101 |
| 11,726,782 B2* | 8/2023 | Olejarz | | G06F 8/77 |
| | | | | 717/101 |
| 11,775,895 B2* | 10/2023 | Bar-on | | G06F 8/20 |
| | | | | 717/103 |
| 2011/0320391 A1* | 12/2011 | Chen | | G06F 11/3457 |
| | | | | 706/14 |
| 2012/0096293 A1* | 4/2012 | Floyd | | G06F 1/3287 |
| | | | | 713/323 |
| 2012/0239825 A1* | 9/2012 | Xia | | G06F 9/44505 |
| | | | | 709/250 |
| 2014/0281608 A1* | 9/2014 | Yin | | G06F 1/3234 |
| | | | | 713/320 |
| 2014/0325481 A1* | 10/2014 | Pillai | | G06F 11/3003 |
| | | | | 717/124 |
| 2015/0121113 A1* | 4/2015 | Ramamurthy | | H02J 9/062 |
| | | | | 713/340 |
| 2015/0324182 A1* | 11/2015 | Barros | | G06F 9/455 |
| | | | | 717/174 |
| 2017/0031622 A1* | 2/2017 | Nagarajan | | G06F 3/0607 |
| 2017/0235662 A1* | 8/2017 | Leask | | G06Q 10/00 |
| | | | | 717/125 |
| 2022/0116286 A1* | 4/2022 | Doshi | | H04L 41/5025 |
| 2022/0345931 A1* | 10/2022 | Svennebring | | H04M 15/8044 |
| 2022/0413992 A1* | 12/2022 | Nguyen | | G06F 11/3428 |
| 2023/0124264 A1* | 4/2023 | Nixon | | G06F 9/3017 |
| | | | | 700/99 |
| 2023/0136226 A1* | 5/2023 | Mo | | G06F 9/5022 |
| | | | | 718/104 |

* cited by examiner

INTEGRATED APPLICATION PERFORMANCE AND INFRASTRUCTURE MANAGEMENT

RELATED APPLICATIONS

The present application is a National Phase of International Application No. PCT/US2022/054233, filed Dec. 29, 2022.

TECHNICAL FIELD

This description relates to an Application Management as a Service (AMaaS) Dashboard system for providing integrated application performance and infrastructure management according to at least one embodiment, and method of using the same.

BACKGROUND

Different teams are involved in software development and support. There are independent teams for application development/architecting, infrastructure deployment and management, and operations and maintenance. A development team develops an application and provides dimensioning for the application, e.g., hardware used, CPU, number of recommended simultaneous users, etc. Based upon this dimensioning, the infrastructure team allocates the appropriate number of servers, cores, CPUs, memory for a traffic forecast. The infrastructure allocation changes based upon changes in the capacity, e.g., the number of users increase.

At utilization changes, dimensioning changes and incidents occur. However, the different teams operate in independent silos without a process to provide feedback from or to the other teams. Each team focuses on their own goals and work assignments independently and knowledge is shared between the teams when a problem causes one team to communicate issues to the other. However, the different teams do not try to understand each other's problem. A continuous feedback and improvement loop is not established between the teams.

SUMMARY

In at least embodiment, a method for providing integrated application performance and infrastructure management includes proactively monitoring performance of an application and utilization of provisioned infrastructure for supporting the application, determining at least one of the application is not performing according to application dimensioning information or the provisioned infrastructure is being over utilized, in response to determining the provisioned infrastructure is being over utilized, initiating an adjustment to the provisioned infrastructure to prevent over utilization, in response to determining the application is not performing according to the application dimensioning information, generating an alert indicating the application is not performing according to the application dimensioning information, and in response to the alert, updating the application dimensioning information or adjusting the application to perform according to the application dimensioning information.

In at least one embodiment, a system for providing integrated application performance and infrastructure management includes a memory storing computer-readable instructions, and a processor connected to the memory, wherein the processor is configured to execute the computer-readable instructions to implement a proactive monitoring platform for proactively monitoring performance of an application and utilization of provisioned infrastructure for supporting the application, determine, by the proactive monitoring platform, at least one of the application not performing according to application dimensioning information or the provisioned infrastructure is being over utilized, implement an application infrastructure provisioning and deployment platform, the application infrastructure provisioning and deployment platform receiving form the proactive monitoring platform information about the provisioned infrastructure being over utilized to initiate an adjustment to the provisioned infrastructure to prevent over utilization, and implement an application management as a service (AMaaS) dashboard, wherein in response to the proactive monitoring platform determining that the application is not performing according to the application dimensioning information, sending, by the proactive monitoring platform, an alert indicating the application is not performing according to the application dimensioning information to the AMaaS dashboard, wherein the AMaaS dashboard generates feedback to update the application dimensioning information or to adjust the application to perform according to the application dimensioning information.

In at least one embodiment, a non-transitory computer-readable media having computer-readable instructions stored thereon, which when executed by a processor causes the processor to perform operations including proactively monitoring performance of an application and utilization of provisioned infrastructure for supporting the application, determining at least one of the application is not performing according to application dimensioning information or the provisioned infrastructure is being over utilized, in response to determining the provisioned infrastructure is being over utilized, initiating an adjustment to the provisioned infrastructure to prevent over utilization, in response to determining the application is not performing according to the application dimensioning information, generating an alert indicating the application is not performing according to the application dimensioning information, and in response to the alert, updating the application dimensioning information or adjusting the application to perform according to the application dimensioning information.

BRIEF DESCRIPTION OF THE DRAWINGS

Aspects of the present disclosure are best understood from the following detailed description when read with the accompanying figures. It is noted that, in accordance with the practice in the industry, various features are not drawn to scale. In fact, the dimensions of the various features are able to be increased or reduced for clarity of discussion.

DETAILED DESCRIPTION

Figure 1:
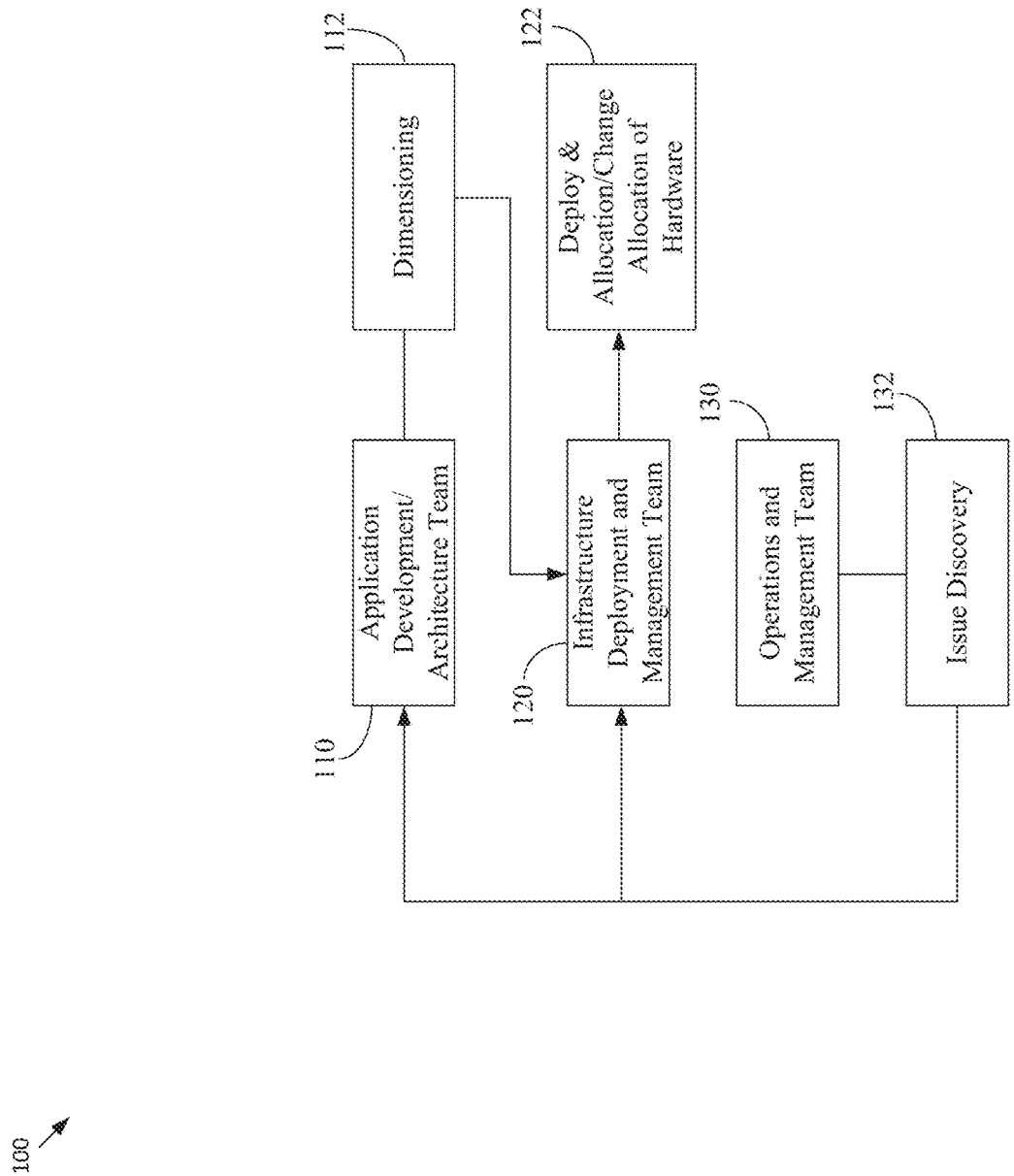
FIG. 1 a flow diagram of communication between teams involved in software development and support according to at least one embodiment.

Embodiments described herein describes examples for implementing different features of the provided subject matter. Examples of components, values, operations, materials, arrangements, or the like, are described below to simplify the present disclosure. These are, of course, examples and are not intended to be limiting. Other components, values, operations, materials, arrangements, or the like, are contemplated. For example, the formation of a first feature over or on a second feature in the description that follows include embodiments in which the first and second features are formed in direct contact and include embodiments in which additional features are formed between the first and second features, such that the first and second features are unable to make direct contact. In addition, the present disclosure repeats reference numerals and/or letters in the various examples. This repetition is for the purpose of simplicity and clarity and does not in dictate a relationship between the various embodiments and/or configurations discussed.

Further, spatially relative terms, such as "beneath," "below," "lower," "above," "upper" and the like, are used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus is otherwise oriented (rotated 90 degrees or at other orientations) and the spatially relative descriptors used herein likewise are interpreted accordingly.

Terms like "user equipment," "mobile station," "mobile," "mobile device," "subscriber station," "subscriber equipment," "access terminal," "terminal," "handset," and similar terminology, refer to a wireless device utilized by a subscriber or user of a wireless communication service to receive or convey data, control, voice, video, sound, gaming, or a data-stream or signaling-stream. The foregoing terms are utilized interchangeably in the subject specification and related drawings. The terms "access point," "base station," "Node B," "evolved Node B (eNode B)," next generation Node B (gNB), enhanced gNB (en-gNB), home Node B (HNB)," "home access point (HAP)," or the like refer to a wireless network component or apparatus that serves and receives data, control, voice, video, sound, gaming, or a data-stream or signaling-stream from UE.

In at least one embodiment, a method for providing integrated application performance and infrastructure management includes proactively monitoring performance of an application and utilization of provisioned infrastructure for supporting the application, determining at least one of the application is not performing according to application dimensioning information or the provisioned infrastructure is being over utilized, in response to determining the provisioned infrastructure is being over utilized, initiating an adjustment to the provisioned infrastructure to prevent over utilization, in response to determining the application is not performing according to the application dimensioning information, generating an alert indicating the application is not performing according to the application dimensioning information, and in response to the alert, updating the application dimensioning information or adjusting the application to perform according to the application dimensioning information.

The embodiments described herein provide a method that provides one or more advantages. For example, the Application Management as a Service (AMaaS) Dashboard system provides an end-to-end framework from application basic dimensioning to monitoring, feedback and continuous improvement to deliver continuous validation of basic dimensioning for an application based upon actual traffic. The AMaaS Dashboard system provides integrated application performance and infrastructure management through proactively monitoring performance of an application and utilization of provisioned infrastructure and integrating communication between development, architecture, deployment, and management teams. Auto-scaling validation is provided based upon forecasted dimensioning, production traffic, and infrastructure utilization, and capacity management based on proactively monitoring performance of an application and utilization of provisioned infrastructure for supporting the application. AMaaS Dashboard system is able to share feedback to an Application Development/Architecture team that then works on optimizing the application code, the application dimensioning to provision, and the application utilization and traffic forecast. The AMaaS Dashboard system also provides continuous automated fine-tuning and infrastructure cost reduction. The infrastructure cost is able to be reduced because the appropriate infrastructure that is to be provisioned is identified, and in response to an application using more infrastructure, the application is able to be optimized to reduce the infrastructure cost and forecast.

FIG. 1 a flow diagram 100 of communication between teams involved in software development and support according to at least one embodiment.

In FIG. 1, different teams are involved in the development and support of applications. For example, as shown in FIG. 1, the teams include an Applications Development/Architecture team 110, an Infrastructure Deployment and Management team 120, and an Operations and Maintenance team 130.

The Applications Development/Architecture team 110 creates Dimensioning 112 of the application to calculate the infrastructure parameters for application deployment and capacity management based on traffic and infrastructure usage. Dimensioning 112 considers the traffic and number of users of an application and the effect on infrastructure used to support the application.

For example, the Applications Development/Architecture team 110 informs the Infrastructure Deployment and Management team 120 about the number of servers and CPUs that application is forecasted to use, the types and number of CPUs, memory usage estimates, server architecture to use to support the application, etc.

The Infrastructure Deployment and Management team 120 Deploys And Allocates Hardware 122 to support an application. The hardware that is to be allocated includes a number of severs, a number of processor cores, a number of central processing units (CPUs), an amount of memory, etc. The infrastructure allocation is based on application team estimates and traffic forecasts. Infrastructure allocation changes based upon capacity parameters, incidents, feedback from Operations and Maintenance team 130, observations of infrastructure utilization, application performance, server loads, etc.

The Operations and Maintenance team 130 performs Issue Discovery 132. For example, Operations and Maintenance team 130 performs Issue Discovery 132 by measuring and analyzing processes for efficiency and effectiveness. The Operations and Maintenance team 130 involve network, system and database administrators as well as other administrators responsible for the setup and maintenance of systems and infrastructure. Operations focus on making sure that the developed software is available for users, thus involving activities such as; deployment, maintenance, support and monitoring. The Operations and Maintenance team 130 performs Issue Discovery 132 to ensure that the application once deployed runs smoothly and serves the purpose that the application was intended.

The Operations and Maintenance team 130 also identifies and addresses bugs and reports the bugs to the Applications Development/Architecture team 110. The Operations and Maintenance team 130 also reports infrastructure issues to the Infrastructure Deployment and Management team 120.

For example, in response to identifying an infrastructure issue, such as servers being overloaded, memory thresholds being exceeded, the Operations and Maintenance team 130 also reports the infrastructure issues to the Infrastructure Deployment and Management team 120 so that the Infrastructure Deployment and Management team 120 adds more servers, CPUs, memory, etc.

Figure 2:
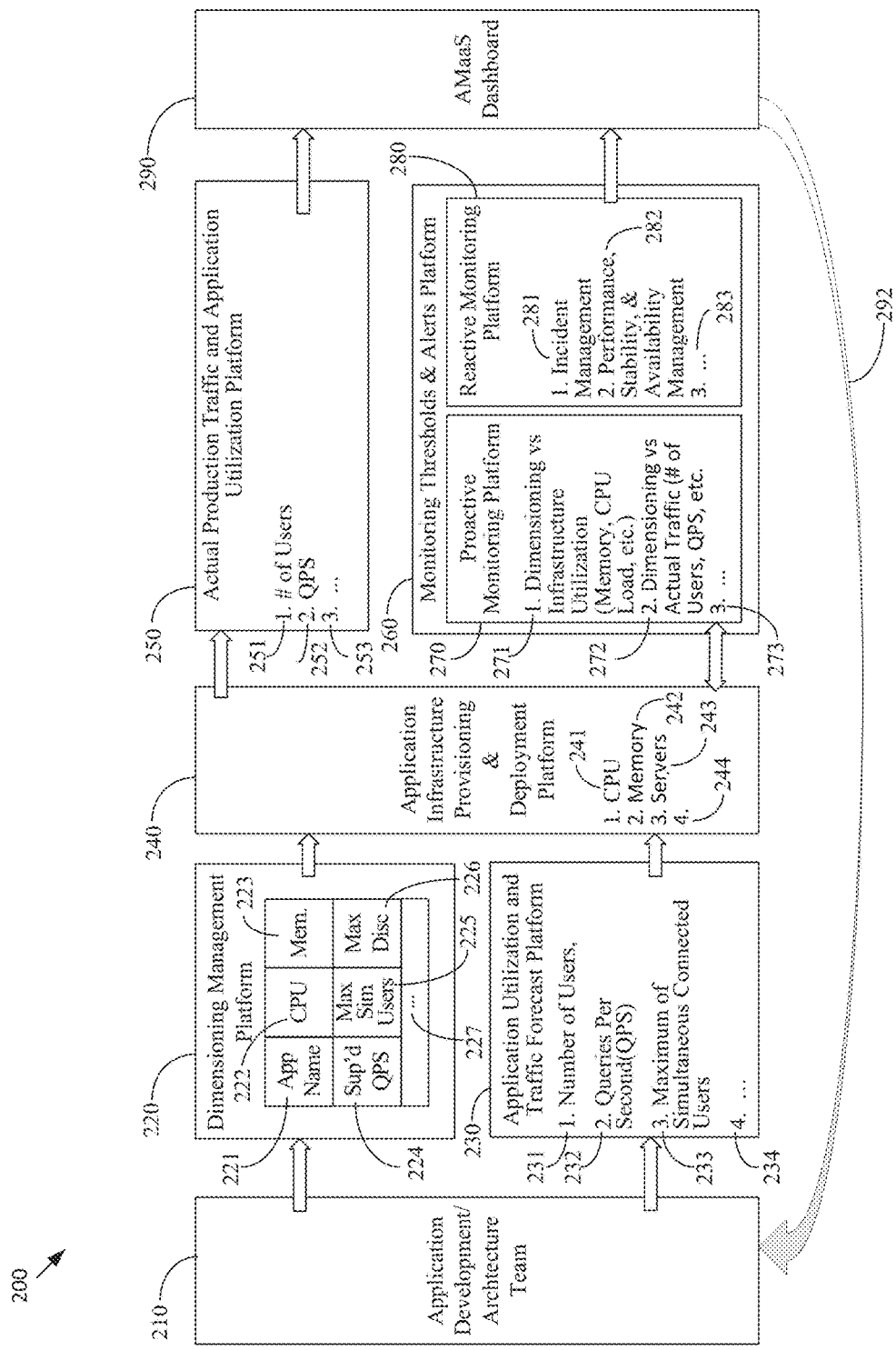
FIG. 2 illustrates a system for providing integrated application performance and infrastructure management according to at least one embodiment.

FIG. 2 illustrates a system 200 for providing integrated application performance and infrastructure management according to at least one embodiment.

In FIG. 2, system 200 provides an online platform that provides automatic dimensioning calculations based on integrated communication between teams that previously operated independently without the use of structured or automated feedback between the teams. According to at least one embodiment as described herein, communication is integrated between an applications development/architecture team, an infrastructure deployment and management team, and an operations and maintenance team to provide efficient application management.

Applications Development/Architecture team 210 define dimensioning for an application and provide the dimensioning information to a Dimensioning Management Platform 220. Dimensioning Management Platform 220 captures basic dimensioning of all applications (POD configuration, capacity of one POD in terms of QPS, supported user count etc.). Applications Development/Architecture team 210 provide the Dimensioning Management Platform 220 information such as Application Name 221, Number of CPUs 222, an Amount of Memory 223, Supported Queries Per Second (QPS) 224, a Maximum Simultaneous Users 225, a Maximum Disconnections 226, and additional dimensioning information 227. Basic dimensioning parameters and attributes described above are provided as examples, but additional or other information is possible as such information is dependent upon the application type.

For example, for 100 users, the Applications Development/Architecture Team recommends 2 servers are to be used, and for 1,000,000 users, the developers specify that 40 servers are to be used. The Applications Development/Architecture Team 210 identifies 1,000 supported Queries Per Second (QPS). The dimensioning also includes what size memory is recommended, as well as number of CPU cores, RAM (Random Access Memory), and other dimensioning parameters. For example, each server may have 10 Terabytes of storage, 8 CPU cores, 10 Gigabytes of RAM, etc. The dimensioning changes based on the number of users, QPS, the activity of the users, type of application, etc.

The Applications Development/Architecture team 210 also provide information to an Application Utilization and Traffic Forecast Platform 230. The Applications Development/Architecture team 210 provide the Application Utilization and Traffic Forecast Platform 230 information such as a Number of Users 231, QPS 232, a Maximum of Simultaneous Connected Users, etc. Based on the information provide to the Application Utilization and Traffic Forecast Platform 230 by the Applications Development/Architecture team 210, application utilization and traffic forecast data is generated by the Application Utilization And Traffic Forecast Platform 230.

The Dimensioning Management Platform 220 provides an Application Infrastructure Provisioning and Deployment Platform 240 information about infrastructure that the application uses. Application Infrastructure Provisioning and Deployment Platform 240 is used by an infrastructure deployment and management team to obtain information to provision and deploy the appropriate hardware to support the application. The infrastructure deployment and management team calculates infrastructure forecasts based upon application use cases, expected traffic/utilization (QPS, user count, simultaneous sessions, etc.

For example, the Dimensioning Management Platform 220 provides the Application Infrastructure Provisioning and Deployment Platform 240 the Application Name 221, Number of CPUs 222, an Amount of Memory 223, Supported Operations Per Second (OPS) 224, a Maximum Simultaneous Users 225, a Maximum Disconnections 226, etc.

The Application Utilization and Traffic Forecast Platform 230 provides the Application Infrastructure Provisioning and Deployment Platform 240 the Number of Users 231, Queries Per Second (QPS) 232, the Maximum of Simultaneous Connected Users 233, and other additional information 234. The Application Infrastructure Provisioning and Deployment Platform 240 determines a Number of CPUs 241 to deploy for supporting the application, an Amount of Memory 242 to deploy for supporting the application, a Number of Servers 243 to deploy for supporting the application, and other additional information 244.

The Application Infrastructure Provisioning and Deployment Platform 240 provides provisioning and deployment information to the Actual Production Traffic and Application Utilization Platform 250. The Actual Production Traffic and Application Utilization Platform 250 determines the actual production traffic and application utilization, such as the Number of Users 251, the QPS 252, and other additional information 253. Actual production traffic and application utilization platform 250 uses key performance indicators (KPIs) to determine production traffic and application utilization data. Production traffic and application utilization data is derived from actual production traffic and application utilization data obtained from the Application Utilization and Traffic Forecast Platform 240.

A Monitoring Threshold and Alerts Platform 260 is used by an operations and maintenance team provide proactive and reactive monitoring of the application and supporting infrastructure as well as to trigger alerts regarding issues with the operation of the application and supporting infrastructure. The alerts provide continuous validation of basic dimensioning and are able to be triggered in situations where the system is not experiencing functional issues. Accordingly, the alerts enable basic dimensioning optimization and resource re-provisioning. Monitoring Threshold and Alerts Platform 260 includes Proactive Monitoring Platform 270 for providing proactive dimensioning fine-tuning.

For example, the Proactive Monitoring Platform 270 determines the Dimensioning versus Infrastructure Utilization 271, such as the Amount of Memory Used, the CPU Load, etc. Proactive Monitoring Platform 270 also determines the Dimensioning (e.g., resource provisioning) versus Actual Traffic 272, such as the Number of Users, a simultaneous user count, the QPS, etc. Proactive Monitoring Platform 270 is also able to determine other additional information 273. Proactive Monitoring Platform 270 also obtains information about observations of infrastructure utilization, application performance, server load, etc. The Proactive Monitoring Platform 270 exchanges information with Application Infrastructure Provisioning and Deployment Platform 240 so that the infrastructure deployment and management team is able to modify the architecture allocation for optimization to cause the application to operate efficiently.

Thus, the infrastructure deployment and management team receives feedback through the Application Infrastructure Provisioning and Deployment Platform 240 from the Operation and Maintenance team via the Proactive Monitoring Platform 270. Application Infrastructure Provisioning and Deployment Platform 240 receives from Proactive Monitoring Platform 270 information about observations of infrastructure utilization, application performance, server load, etc. At one point in time, 40 servers are allocated to service a particular utilization. In response to an increase in the utilization, 45 or 50 servers are allocated.

The Monitoring Threshold and Alerts Platform 260 also includes a Reactive Monitoring Platform 280. The Reactive Monitoring Platform 280 determines information about system stability, performance capacity, and availability based alerts. For example, the Reactive Monitoring Platform 280 gathers information associated with Incident Management 281, information associated with Performance, Stability and Availability Management 282, and other additional information 283. Reactive Monitoring Platform 280 monitors the application to check system stability, performance, capacity, and availability, and generate alerts. The Reactive Monitoring Platform 280 provides the information about the stability, performance capacity, and availability associated with the application to an Application Management as a Service Dashboard 290.

The Application Management as a Service Dashboard 290 also receives information associated with the actual production traffic and application utilization from the Actual Production Traffic and Application Utilization Platform 250. Application Management as a Service Dashboard 290 provides feedback 292 about the operation of the application and the supporting infrastructure to the Applications Development/Architecture team 210. The end-to-end framework of system 200 provides auto-scaling validation based upon infrastructure utilization, and capacity management and basic dimensioning-based infrastructure provisioning. Based upon proactive alerts and statistics obtained by the AMaaS Dashboard 290, feedback 292 is shared with the Application Development/Architecture Team 210 to enable the Application Development/Architecture Team 210 to work on optimization (code optimization, architecture optimization etc.) and update the resource provisioning based upon application performance in production. Each team focuses on their own goals and work assignments while knowledge is automatically shared between the Application Development/Architecture Team 210, the infrastructure deployment and management team through the Application Infrastructure Provisioning and Deployment Platform 240, and the operations and maintenance team via the Proactive Monitoring Platform 270.

For example, the Application Development/Architecture Team 210 focuses on developing an application while the infrastructure deployment and management team through the Application Infrastructure Provisioning and Deployment Platform 240 focuses on providing the infrastructure. The Application Development/Architecture Team 210 is able to ask the infrastructure deployment and management team to add or remove one or more servers to support an application. The infrastructure deployment and management team is able to ask the Application Development/Architecture Team 210 for a modification to an application based on utilization.

Initial allocation is per dimensioning and scale in/scale out per dimensioning specification developed by the Application Development/Architecture Team 210. The infrastructure deployment and management team through the Application Infrastructure Provisioning and Deployment Platform 240 obtains infrastructure usage forecast from Application Utilization and Traffic Forecast Platform 230 and infrastructure provisioning determined by the Application Infrastructure Provisioning and Deployment Platform 240 based upon dimensioning obtained from Dimensioning Management Platform 220 and actual infrastructure utilization provided by Application Utilization and Traffic Forecast Platform 230, e.g., amount of memory used, the CPU load, amount of storage used, etc.

According to at least one embodiment, infrastructure allocation is provided elastically by Application Infrastructure Provisioning and Deployment Platform 240. Elasticity refers to automated scaling-in or scaling-out based on infrastructure use without understanding or analyzing the underlying cause, e.g., whether the application is working as per dimensioning, whether the scaling-in or scaling-out executed per dimensioning specifications, and whether the infrastructure usage forecast and infrastructure provisioning based upon dimensioning and actual infrastructure usage. Logic or algorithms are used by Application Infrastructure Provisioning and Deployment Platform 240 to monitor memory utilization, CPU load, storage, and other dimensioning parameters.

According to at least one embodiment, in response to scaling-in or scaling-out, Proactive Monitoring Platform 270 analyzes and determines the effects of the scaling-in or scaling-out dimensioning. Thus, Proactive Monitoring Platform 270 is able to determine whether the application is working according to the recommended dimensioning and/or the infrastructure is being over utilized. Proactive Monitoring Platform 270 generates an alert in response to a deviation being detected between the information about utilization of the provisioned infrastructure and application performance. The alert is received by the AMaaS Dashboard 290.

The AMaaS Dashboard 290 displays information about the application and the provisioned infrastructure and changes that are to be made to the application or the allocation of hardware to support the application are determined. Based upon monitoring the dimensioning parameters by Proactive Monitoring Platform 270 and Reactive Monitoring Platform 280, AMaaS Dashboard 290 is able to provide feedback to Application Development/Architecture Team 210 and Proactive Monitoring Platform 270 provides feedback to Application Infrastructure Provisioning and Deployment Platform 240. Based on the feedback from the AMaaS Dashboard 290, Application Development/Architecture Team 210 is able to update the application dimensioning information or adjust the application to perform according to the application dimensioning information.

For example, Application Infrastructure Provisioning and Deployment Platform 240 provides information to infrastructure deployment and management team to add a server to a cluster (scale-out) or to remove a server from a cluster (scale-in). Such changes are implemented in response to, for example, sale days (black Friday, Holidays, etc.). Based on such events, traffic increases and go autoscaling triggers, for example, a scale-out to increase a number of servers, and in response to the event passing, a scale-in is triggered to reduce the number of servers.

Proactive Monitoring Platform 270 monitors the effects of the scaling-in or scaling-out dimensioning to determine whether the application is working according to the recommended dimensioning. For example, in response to the number of users increasing from 1000 to 10,000 as per application dimensioning, how many servers were added as scaled-out during that time.

Proactive Monitoring Platform 270 investigates the relationship between dimensioning, utilization, and performance. Proactive Monitoring Platform 270 is able to evaluate whether the dimensioning application is working per dimensioning, whenever scaling happens whether it is per dimensioning, and whether infrastructure utilization is as per forecast (business enhancement forecast/business expansion forecast that business is going to increase by 20%, and based upon that, the infrastructure utilization is forecasted). Thus, Proactive Monitoring Platform 270 evaluates the accuracy of the infrastructure forecast based upon business expansion. AMaaS Dashboard 290 continues to monitor the application and provisioned infrastructure, and dimensioning and infrastructure allocation is adjusted, as necessary to enable continuous fine-tuning of the application design and resource provisioning.

Figure 3:
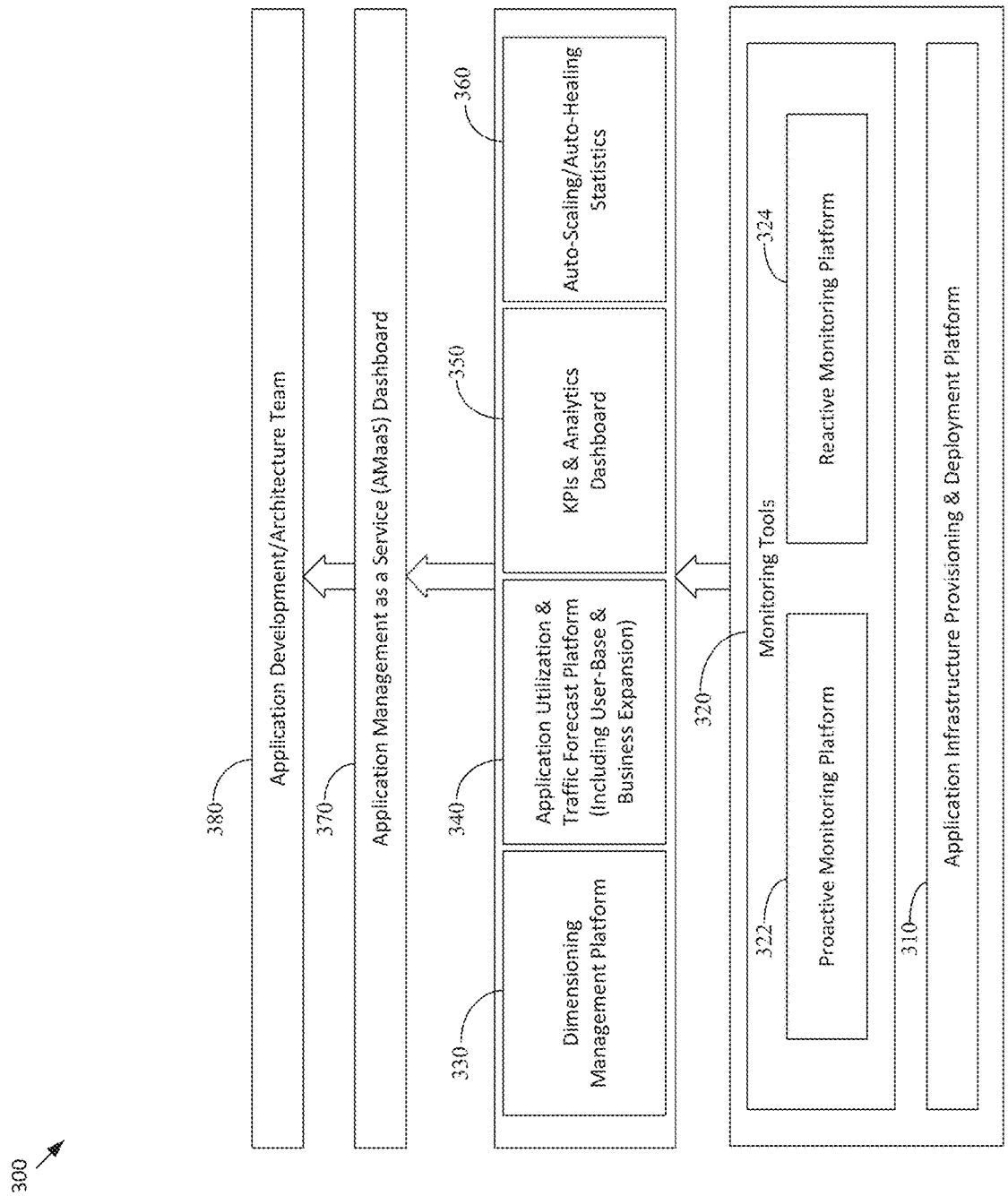
FIG. 3 is an architectural diagram of an Application Management as a Service Dashboard System according to at least one embodiment.

FIG. 3 is an architectural diagram of an Application Management as a Service Dashboard System 300 according to at least one embodiment.

In FIG. 3, Application Infrastructure Provisioning and Deployment Platform 310 is coupled to Monitoring Tools 320. Monitoring Tools 320 include Proactive Monitoring Platform 322 and Reactive Monitoring Platform 324. The Application Infrastructure Provisioning and Deployment Platform 310 and Monitoring Tools 320 are coupled to Dimensioning Management Platform 330, Application Utilization and Traffic Forecast Platform 340, Key Performance Indicators (KPIs) and Analytics Dashboard 350, and Auto-Scaling/Auto-Healing Statistics Platform 360.

Application Management as a Service (AMaaS) Dashboard 370 receives data from Dimensioning Management Platform 330, Application Utilization and Traffic Forecast Platform 340, Key Performance Indicators (KPIs) and Analytics Dashboard 350 (including live traffic), Auto-Scaling/Auto-Healing Statistics Platform 360, and Monitoring Tools 320. Application Management as a Service (AMaaS) Dashboard 370 automatically determines the infrastructure utilization, auto-scaling validity, and expected infrastructure load and provides information to Application Development/Architecture team 380.

Application Infrastructure Provisioning and Deployment Platform 310 implements the provisioning/allocation of hardware to support the application. Monitoring Tools 320 are used to monitor the application. Information from the Dimensioning Management Platform 330, Application Utilization and Traffic Forecast Platform 340, Key Performance Indicators (KPIs) and Analytics Dashboard 350, Auto-Scaling/Auto-Healing Statistics, alerts and information about the application performance from Proactive Monitoring Platform 322, and provisioning of infrastructure by Application Infrastructure Provisioning and Deployment Platform 310 are combined to show, on the AMaaS Dashboard 370, system information including the number of users, the maximum user count, the average user forecast, the average users, the monitoring information including the auto scaling and healing statistics.

AMaaS Dashboard 370 provides feedback to the Application Development/Architecture team 380. The Application Development/Architecture team 380 are then able to make adjustments to the application. The KPIs and analytics presented by the KPIs and Analytics Dashboard 350 is derived from actual production traffic and application utilization data obtained from the Application Utilization and Traffic Forecast Platform 340. Auto-Scaling/Auto-Healing Statistics is provided by the Monitoring Tools 320.

Proactive Monitoring Platform 322 monitors resource provisioning and actual traffic. For example, Proactive Monitoring Platform 322 determines how many simultaneous or overall users, what is the QPS, and based upon the provisioned resources and monitored traffic. Proactive Monitoring Platform 322 generates an alert in response to a deviation being detected between the information about utilization of the provisioned infrastructure and application performance.

Based on the alerts, Dimensioning Management Platform 330 continuously validates the dimensioning associated with the application. For example, in response to a CPU load of 50% being expected with 70 users, and the CPU load is 70% with 70 users, Proactive Monitoring Platform 322 generates an alert because the application is not performing as per dimensioning.

Without proactive monitoring being performed by Proactive Monitoring Platform 322, an alert is not generated because the system is operating in a healthy range and the system is not experiencing any problems. However, even though the system is operating within healthy parameters, the proactive monitoring by Proactive Monitoring Platform 322 indicates that the infrastructure is being over utilized and generates an alert that is received by the AMaaS Dashboard 370.

Application Development/Architecture team 380 receives information from AMaaS Dashboard 370 indicating that the application or the architecture is not operating efficiently and is not operating within the parameters of the dimensioning model. The Application Development/Architecture team 380 is able to modify the application for optimization.

Proactive Monitoring Platform 322 also shares information with the infrastructure deployment and management team through the Application Infrastructure Provisioning and Deployment Platform 310 so that the infrastructure deployment and management team is able to modify the architecture allocation for optimization to cause the application to operate efficiently. By proactively monitoring the dimensioning by Proactive Monitoring Platform 322, infrastructure cost is reduced and/or issues/problems due to over capacity utilization are avoided.

Proactive Monitoring Platform 322 monitors resource provisioning and deployment dimensioning so that information shared with the infrastructure deployment and management team through the Application Infrastructure Provisioning and Deployment Platform 310 is able to be used to adjust infrastructure provisioning. The automated scaling process is elevated to validate the autoscaling based upon infrastructure utilization. Application Management as a Service Dashboard System 300 provides capacity management and basic dimensioning based infrastructure provisioning to provide an end to end logical connectivity and feedback cycle.

For example, Application Development/Architecture team 380 develop the application and the Application Utilization and Traffic Forecast Platform 340 is able to forecast the dimensioning based on an expected user count and/or traffic. The dimensioning data about the utilization and traffic forecast for a predetermined time period is uploaded from Dimensioning Management Platform 330 to the Application Utilization and Traffic Forecast Platform 340. Application Utilization and Traffic Forecast Platform 340 generates the utilization and traffic forecast based on the dimensioning data.

Utilizing the Dimensioning Management Platform 330 and the Application Utilization and Traffic Forecast Platform 340, the infrastructure deployment and management team is able to determine how many CPUs are to be deployed, how much memory is to be provided, how many servers are to be provided, etc. The Dimensioning Management Platform 330 and the Application Utilization and Traffic Forecast Platform 340 are able to be provided in separate platforms or integrated into one platform. Previously, the actual production traffic and application utilization were not considered together even though the information is available separately.

Application Management as a Service Dashboard System 300 according to at least one embodiment provides Reactive Monitoring Platform 324 that works with the Proactive Monitoring Platform 322 to form the Monitoring Tools 320. The Monitoring Tools 320 work with the Application Infrastructure Provisioning and Deployment Platform 310 to produce results through the Dimensioning Management Platform 330, Application Utilization and Traffic Forecast Platform 340, KPIs and Analytics Dashboard 350, and Auto-Scaling/Auto-Healing Statistics Platform 360 that are presented on the AMaaS Dashboard 370. Thus, the user is able to see that scaling was triggered and whether the scaling was expected. The AMaaS Dashboard 370 presents the results using the dimensioning model based on the infrastructure deployment and the actual traffic.

The user is able to determine from the AMaaS Dashboard 370 whether the application performed according to the basic dimensioning. In response to the application not performing according to the basic dimensioning, the AMaaS Dashboard 370 provides feedback to the Application Development/Architecture team 380. The Application Development/Architecture team 380 is then able to update the basic dimensioning or adjust the application to perform according to the previously provided application dimensioning.

Figure 4:
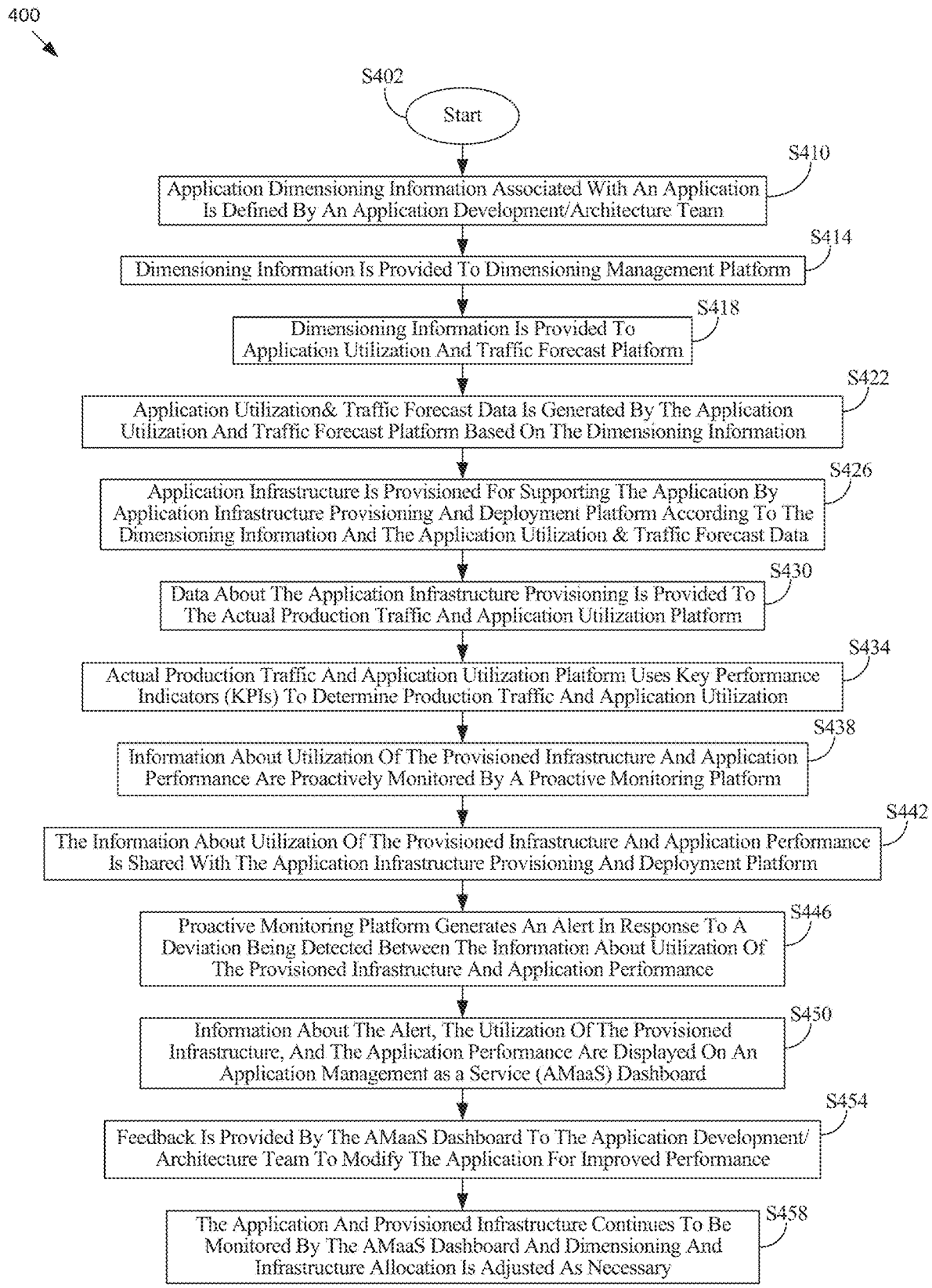
FIG. 4 is a flowchart of a method for providing integrated application performance and infrastructure management via the AMaaS Dashboard system according to at least one embodiment.

FIG. 4 is a flowchart 400 of a method for providing integrated application performance and infrastructure management via the AMaaS Dashboard system according to at least one embodiment.

In FIG. 4, the process starts S402 and application dimensioning information associated with an application is defined by an Application Development/Architecture Team S410. Referring to FIG. 2, Applications Development/Architecture team 210 define dimensioning for an application and provide the dimensioning information to a Dimensioning Management Platform 220.

Dimensioning information is provided to Dimensioning Management Platform S414. Referring to FIG. 2, Applications Development/Architecture team 210 provide the Dimensioning Management Platform 220 information such as Application Name 221, Number of CPUs 222, an Amount of Memory 223, Supported Queries Per Second (QPS) 224, a Maximum Simultaneous Users 225, a Maximum Disconnections 226, and additional dimensioning information 227. Basic dimensioning parameters and attributes described above are provided as examples, but additional or other information is possible as such information is dependent upon the application type. For example, for 100 users, the Applications Development/Architecture Team recommends 2 servers are to be used, and for 1,000,000 users, the developers specify that 40 servers are to be used. The Applications Development/Architecture Team 210 identifies 1,000 supported Queries Per Second (QPS). The dimensioning also includes what size memory is recommended, as well as number of CPU cores, RAM (Random Access Memory), and other dimensioning parameters. For example, each server may have 10 Terabytes of storage, 8 CPU cores, 10 Gigabytes of RAM, etc. The dimensioning changes based on the number of users, QPS, the activity of the users, type of application, etc.

Dimensioning information is provided to Application Utilization And Traffic Forecast Platform S418. Referring to FIG. 2, the Applications Development/Architecture team 210 also provide information to an Application Utilization and Traffic Forecast Platform 230. The Applications Development/Architecture team 210 provide the Application Utilization and Traffic Forecast Platform 230 information such as a Number of Users 231, QPS 232, a Maximum of Simultaneous Connected Users, etc.

Application traffic and utilization forecast data is generated by the Application Utilization And Traffic Forecast Platform based on the dimensioning information S422. Referring to FIG. 2, based on the information provide to the Application Utilization and Traffic Forecast Platform 230 by the Applications Development/Architecture team 210, application utilization and traffic forecast data is generated by the Application Utilization And Traffic Forecast Platform 230.

Application infrastructure is provisioned for supporting the application by Application Infrastructure Provisioning And Deployment Platform according to the dimensioning information and the application utilization and traffic forecast data S426. Referring to FIG. 2, Application Infrastructure Provisioning and Deployment Platform 240 is used by an infrastructure deployment and management team to obtain information to provision and deploy the appropriate hardware to support the application. The infrastructure deployment and management team calculates infrastructure forecasts based upon application use cases, expected traffic/utilization (QPS, user count, simultaneous sessions, etc. The Application Utilization and Traffic Forecast Platform 230 provides the Application Infrastructure Provisioning and Deployment Platform 240 the Number of Users 231, Queries Per Second (QPS) 232, the Maximum of Simultaneous Connected Users 233, and other additional information 234. The Application Infrastructure Provisioning and Deployment Platform 240 determines a Number of CPUs 241 to deploy for supporting the application, an Amount of Memory 242 to deploy for supporting the application, a Number of Servers 243 to deploy for supporting the application, and other additional information 244.

Data about the application infrastructure provisioning is provided to the Actual Production Traffic And Application Utilization Platform S430. Referring to FIG. 2, the Application Infrastructure Provisioning and Deployment Platform 240 provides provisioning and deployment information to the Actual Production Traffic and Application Utilization Platform 250. The Actual Production Traffic and Application Utilization Platform 250 determines the actual production traffic and application utilization, such as the Number of Users 251, the QPS 252, and other additional information 253.

Actual production traffic and application utilization platform uses key performance indicators (KPIs) to determine production traffic and application utilization S434. Referring to FIG. 3, the KPIs and analytics presented by the KPIs and Analytics Dashboard 350 is derived from actual production traffic and application utilization data obtained from the Application Utilization and Traffic Forecast Platform 340.

Information about utilization of the provisioned infrastructure and application performance are proactively monitored by Proactive Monitoring Platform S438. Referring to FIG. 2, Proactive Monitoring Platform 270 determines the Dimensioning versus Infrastructure Utilization 271, such as the Amount of Memory Used, the CPU Load, etc. Proactive Monitoring Platform 270 also determines the Dimensioning versus Actual Traffic 272, such as the Number of Users, the QPS, etc. Proactive Monitoring Platform 270 is also able to determine other additional information 273. Proactive Monitoring Platform 270 also obtains information about observations of infrastructure utilization, application performance, server load, etc.

The information about utilization of the provisioned infrastructure and application performance is shared with the Application Infrastructure Provisioning And Deployment Platform S442. Referring to FIG. 2, the Proactive Monitoring Platform 270 exchanges information with Application Infrastructure Provisioning and Deployment Platform 240. Thus, the infrastructure deployment and management team receives feedback through the Application Infrastructure Provisioning and Deployment Platform 240 from the Operation and Maintenance team via the Proactive Monitoring Platform 270. Application Infrastructure Provisioning and Deployment Platform 240 receives from Proactive Monitoring Platform 270 information about observations of infrastructure utilization, application performance, server load, etc.

Proactive Monitoring Platform generates an alert in response to a deviation being detected between the information about utilization of the provisioned infrastructure and application performance S446. Referring to FIG. 3, Proactive Monitoring Platform 322 monitors resource provisioning and actual traffic. For example, Proactive Monitoring Platform 322 determines how many simultaneous or overall users, what is the QPS, and based upon the provisioned resources and monitored traffic. Proactive Monitoring Platform 322 generates an alert in response to a deviation being detected between the information about utilization of the provisioned infrastructure and application performance.

Information about the alert, the utilization of the provisioned infrastructure, and the application performance are displayed on an Application Management as a Service (AMaaS) Dashboard S450. Referring to FIG. 3, Information from the Dimensioning Management Platform 330, Application Utilization and Traffic Forecast Platform 340, Key Performance Indicators (KPIs) and Analytics Dashboard 350, Auto-Scaling/Auto-Healing Statistics, alerts and information about the application performance from Proactive Monitoring Platform 322, and provisioning of infrastructure by Application Infrastructure Provisioning and Deployment Platform 310 are combined to show, on the AMaaS Dashboard 370, system information including the number of users, the maximum user count, the average user forecast, the average users, the monitoring information including the auto scaling and healing statistics.

Feedback is provided by the AMaaS Dashboard to the Application Development/Architecture Team to modify the application for improved performance S454. Referring to FIG. 2, the AMaaS Dashboard 290 is able to determine changes that are to be made to the application or the allocation of hardware to support the application. Based upon monitoring the dimensioning parameters by Proactive Monitoring Platform 270 and Reactive Monitoring Platform 280, AMaaS Dashboard 290 is able to provide feedback to Application Development/Architecture Team 210.

The application and provisioned infrastructure continue to be monitored by the AMaaS Dashboard and dimensioning and infrastructure allocation is adjusted as necessary S458. Referring to FIG. 2, AMaaS Dashboard 290 continues to monitor the application and provisioned infrastructure, and dimensioning and infrastructure allocation is adjusted, as necessary.

At least one embodiment of the method for providing integrated application performance and infrastructure management includes proactively monitoring performance of an application and utilization of provisioned infrastructure for supporting the application, determining at least one of the application is not performing according to application dimensioning information or the provisioned infrastructure is being over utilized, in response to determining the provisioned infrastructure is being over utilized, initiating an adjustment to the provisioned infrastructure to prevent over utilization, in response to determining the application is not performing according to the application dimensioning information, generating an alert indicating the application is not performing according to the application dimensioning information, and in response to the alert, updating the application dimensioning information or adjusting the application to perform according to the application dimensioning information.

Figure 5:
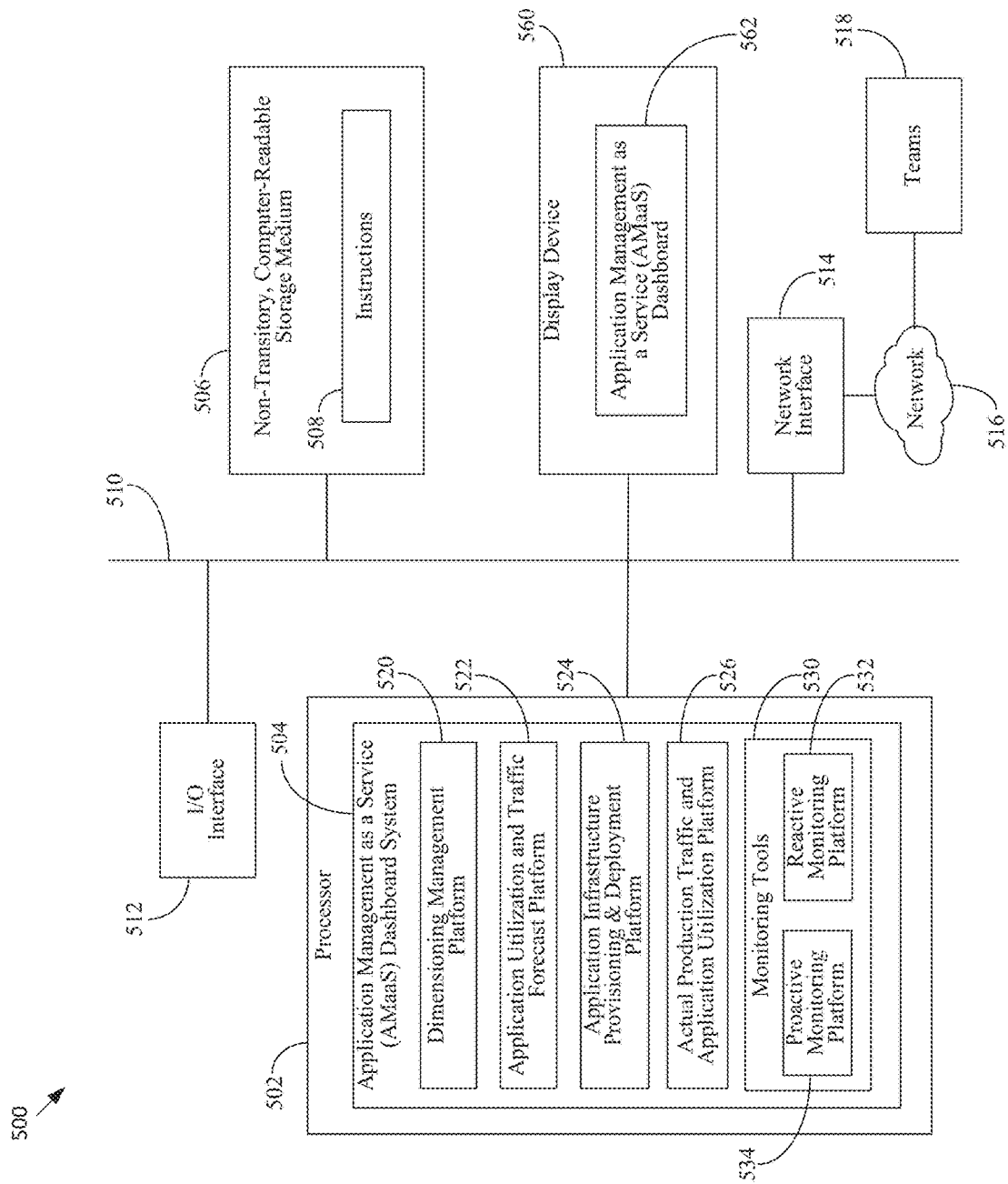
FIG. 5 is a high-level functional block diagram of a Processor-Based System according to at least one embodiment.

FIG. 5 is a high-level functional block diagram of a Processor-Based System 500 according to at least one embodiment.

In at least one embodiment, Processor 502 implements an Application Management as a Service (AMaaS) Dashboard System 504 for providing integrated application performance and infrastructure management. Processor 502 implements the AMaaS Dashboard System 504 for providing integrated application performance and infrastructure management using Processor 502. Processing Circuitry 500 includes a Non-Transitory, Computer-Readable Storage Medium 506 that is used to implement the AMaaS Dashboard System 504 for providing integrated application performance and infrastructure management.

Non-Transitory, Computer-Readable Storage Medium 506, amongst other things, is encoded with, i.e., stores, Instructions 508, i.e., computer program code that are executed by Processor 502 causes Processor 502 to perform operations for providing integrated application performance and infrastructure management via the AMaaS Dashboard System 504. Execution of Instructions 508 by Processor 502 represents (at least in part) an application which implements at least a portion of the methods described herein in accordance with one or more embodiments (hereinafter, the noted processes and/or methods).

Processor 502 is electrically coupled to Computer-Readable Storage Medium 506 via a Bus 510. Processor 502 is electrically coupled to an Input/Output (I/O) Interface 512 by Bus 510. Network Interface 514 is also electrically connected to Processor 502 via Bus 510. Network Interface 514 is connected to a Network 516, so that Processor 502 and Non-Transitory, Computer-Readable Storage Medium 506 connect to Teams 518 via Network 516. For example, Teams 518 includes one or more of an application development/architecture team, an infrastructure deployment and management team, or an operations and management team Processor 502 is configured to execute Instructions 508 encoded in Non-Transitory, Computer-Readable Storage Medium 506 to cause Processing Circuitry 500 to be usable for performing at least a portion of the processes and/or methods. In one or more embodiments, Processor 502 is a Central Processing Unit (CPU), a multi-processor, a distributed processing system, an Application Specific Integrated Circuit (ASIC), and/or a suitable processing unit.

Processing Circuitry 500 includes I/O Interface 512. I/O Interface 512 is coupled to external circuitry. In one or more embodiments, I/O Interface 512 includes a keyboard, keypad, mouse, trackball, trackpad, touchscreen, and/or cursor direction keys for communicating information and commands to Processor 502.

Processing Circuitry 500 also includes Network Interface 514 coupled to Processor 502. Network Interface 514 allows Processing Circuitry 500 to communicate with Network 516, to which one or more other computer systems are connected, and to provide communication with Teams 518. AMaaS Dashboard System 504 provides integrated application performance and infrastructure management through communication with Teams 518.

Network Interface 514 includes wireless network interfaces such as Bluetooth, Wi-Fi, Worldwide Interoperability for Microwave Access (WiMAX), General Packet Radio Service (GPRS), or Wideband Code Division Multiple Access (WCDMA); or wired network interfaces such as Ethernet, Universal Serial Bus (USB), or Institute of Electrical and Electronics Engineers (IEEE) 864.

Processing Circuitry 500 is configured to receive information through I/O Interface 512. The information received through I/O Interface 512 includes one or more of instructions, data, design rules, libraries of cells, and/or other parameters for processing by Processor 502. The information is transferred to Processor 502 via Bus 510. Processing circuitry 500 is configured to receive information related to a User Interface (UIthrough I/O Interface 512. The information is stored in Non-Transitory, Computer-Readable Storage Medium 506 as UI 522.

In one or more embodiments, one or more Non-Transitory, Computer-Readable Storage Medium 506 having stored thereon instructions (in compressed or uncompressed form) that may be used to program a computer, processor, or other electronic device) to perform processes or methods described herein. The one or more Non-Transitory, Computer-Readable Storage Medium 506 includes one or more of an electronic storage medium, a magnetic storage medium, an optical storage medium, a quantum storage medium, or the like.

For example, the computer-readable storage media may include, but are not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. In one or more embodiments using optical disks, the one or more Non-Transitory, Computer-Readable Storage Medium 506 includes a Compact Disk-Read Only Memory (CD-ROM), a Compact Disk-Read/Write (CD-R/W), and/or a Digital Video Disc (DVD).

In one or more embodiments, Non-Transitory, Computer-Readable Storage Medium 506 stores computer program code or Instructions 508 configured to cause Processor 502 to perform at least a portion of the processes and/or methods for providing integrated application performance and infrastructure management via the AMaaS Dashboard system. In one or more embodiments, Non-Transitory, Computer-Readable Storage Medium 506 also stores information, such as algorithm which facilitates performing at least a portion of the processes and/or methods for providing integrated application performance and infrastructure management via the AMaaS Dashboard System 504.

Accordingly, in at least one embodiment, the Processor 502 executes Instructions 508 stored on the one or more Non-Transitory, Computer-Readable Storage Medium 506 to implement AMaaS Dashboard System 502 for providing integrated application performance and infrastructure management. Processor 502 executes Instructions 508 stored on the one or more Non-Transitory, Computer-Readable Storage Medium 506 to implement Dimensioning Management Platform 520, Application Utilization and Traffic Forecast Platform 522, Application Infrastructure Provisioning & Deployment Platform 524, Actual Production Traffic and Application Utilization Platform 526, and Monitoring Tools 530, including Reactive Monitoring Platform 532 and Proactive Monitoring Platform 534.

Teams 518 provide input to Dimensioning Management Platform 520. Teams 518 also provide information to Application Utilization and Traffic Forecast Platform 522. Processor 502 causes Dimensioning Management Platform 520 to provide Application Infrastructure Provisioning and Deployment Platform 524 information about infrastructure that the application uses. Application Infrastructure Provisioning and Deployment Platform 524 is used by Teams 516 to obtain information to provision and deploy the appropriate hardware to support the application.

Processor 502 causes Application Utilization and Traffic Forecast Platform 522 to provide the Application Infrastructure Provisioning and Deployment Platform 524 information for allocation of hardware for supporting the application. Processor 502 causes Application Infrastructure Provisioning and Deployment Platform 524 to provide provisioning and deployment information to Actual Production Traffic and Application Utilization Platform 526. Processor 502 causes Actual Production Traffic and Application Utilization Platform 526 to determine the actual production traffic and application utilization. Actual production traffic and application utilization platform 526 uses key performance indicators (KPIs) to determine production traffic and application utilization data. Production traffic and application utilization data is derived from actual production traffic and application utilization data obtained from the Application Utilization and Traffic Forecast Platform 526.

Monitoring Tools 530 is used by Teams 516 to provide proactive and reactive monitoring of the application and supporting infrastructure as well as to trigger alerts regarding issues with the operation of the application and supporting infrastructure. Monitoring Tools 530 includes Reactive Monitoring Platform 532 and Proactive Monitoring Platform 534. Processor 502 causes Proactive Monitoring Platform 534 to provide proactive dimensioning fine-tuning. For example, Processor 502 causes Proactive Monitoring Platform 534 to determine the dimensioning versus infrastructure utilization. Processor 502 also causes Proactive Monitoring Platform 534 to determine the dimensioning versus actual traffic. Proactive Monitoring Platform 534 continuously monitors the performance of the application and the utilization of the provisioned infrastructure to validate the application dimensioning information and the infrastructure provisioning. Thus, Proactive Monitoring Platform 534 is able to determine the application us not performing according to application dimensioning information or the provisioned infrastructure is being over utilized.

Processor 502 causes Proactive Monitoring Platform 534 to exchange information with Application Infrastructure Provisioning and Deployment Platform 524. Thus, Teams 516 receives feedback through the Application Infrastructure Provisioning and Deployment Platform 524 via the Proactive Monitoring Platform 534. Application Infrastructure Provisioning and Deployment Platform 524 receives from Proactive Monitoring Platform 534 information about observations of infrastructure utilization, application performance, server load, etc., and is able to adjust the provisioned infrastructure to prevent over utilization.

Monitoring Tools 530 also includes Reactive Monitoring Platform 532. Processor 502 causes Reactive Monitoring Platform 532 to determine information about the stability, performance and capacity associated with the application. For example, Processor 502 causes Reactive Monitoring Platform 532 to gather information associated with incident management, information associated with performance, stability and availability management, and other additional information. Processor 502 causes Reactive Monitoring Platform 532 to monitor the application and allocated hardware to check the stability, performance, and capacity, and to generate alerts based upon availability. Processor 502 causes Reactive Monitoring Platform 532 to provide such information to an AMaaS Dashboard 562 on Display Device 560.

Proactive Monitoring Platform 534 generates an alert in response to a deviation being detected between the information about utilization of the provisioned infrastructure and application performance. The alert is received by the AMaaS Dashboard 562. The AMaaS Dashboard 562 displays information about the application and the provisioned infrastructure and is able to determine changes that are to be made to the application or the allocation of hardware to support the application. Based upon monitoring the dimensioning parameters by Proactive Monitoring Platform 534 and Reactive Monitoring Platform 532, AMaaS Dashboard 562 is able to provide feedback to Teams 518 (e.g., Application Development/Architecture Team) and Proactive Monitoring Platform 534 provides feedback to Application Infrastructure Provisioning and Deployment Platform 524. Based on the feedback from the AMaaS Dashboard 562, Teams 518 are able to update the application dimensioning information or adjust the application to perform according to the application dimensioning information.

AMaaS Dashboard 562 also receives information associated with the actual production traffic and application utilization from Actual Production Traffic and Application Utilization Platform 526. AMaaS Dashboard 562 provides feedback about the operation of the application and the supporting infrastructure to Teams 518. Teams 518 focus on their individual goals and work assignments while knowledge is automatically shared between members of Teams 518 through Application Infrastructure Provisioning and Deployment Platform 524 and Proactive Monitoring Platform 534.

Initial allocation is per dimensioning and scale in/scale out per dimensioning specification developed by Teams 518. Application Infrastructure Provisioning and Deployment Platform 524 obtains infrastructure usage forecast from Application Utilization and Traffic Forecast Platform 526 and infrastructure provisioning determined by the Application Infrastructure Provisioning and Deployment Platform 524 based upon dimensioning obtained from Dimensioning Management Platform 520 and actual infrastructure utilization provided by Application Utilization and Traffic Forecast Platform 526.

In response to scaling-in or scaling-out, Processor 502 causes Proactive Monitoring Platform 534 to analyze and determine the effects of the scaling-in or scaling-out dimensioning. Thus, Proactive Monitoring Platform 270 is able to determine whether the application is working according to the recommended dimensioning. AMaaS Dashboard System 504 is able to determine changes that are to be made to the application or the allocation of hardware to support the application.

Based upon monitoring the dimensioning parameters by Reactive Monitoring Platform 532 and Proactive Monitoring Platform 534, AMaaS Dashboard System 504 is able to provide feedback through AMaaS Dashboard 562 to Teams 518. Processor 502 causes Proactive Monitoring Platform 534 to provide feedback to Application Infrastructure Provisioning and Deployment Platform 524.

Processor 502 causes Proactive Monitoring Platform 534 to monitor the effects of the scaling-in or scaling-out dimensioning to determine whether the application is working according to the recommended dimensioning. Processor 502 causes Proactive Monitoring Platform 534 to analyze the relationship between the dimensioning, utilization and performance. Proactive Monitoring Platform 270 is able to evaluate whether the dimensioning application is working per dimensioning, whenever scaling happens whether it is per dimensioning, and whether infrastructure utilization is as per forecast.

Embodiments described herein provide a method that provides one or more advantages. For example, based upon proactive monitoring and actual production traffic and application utilization, an AMaaS Dashboard System 504 is able to shares feedback to Team 518 that then works on optimizing the application code, the application dimensioning to provision, and the application utilization and traffic forecast. The AMaaS Dashboard System 504 provides an end-to-end framework for application performance, infrastructure provisioning, utilization, and capacity management of each application. The AMaaS Dashboard System 504 provides continuous validation of basic dimensioning of each application based upon actual traffic in production. Fully automated auto scaling validation capability is provided based upon forecasted dimensioning, actual production traffic, infrastructure usage, and capacity management. AMaaS Dashboard system 504 is able to share feedback to an Application Development/Architecture team that then works on optimizing the application code, the application dimensioning to provision, and the application utilization and traffic forecast. The AMaaS Dashboard System 504 also provides continuous automated fine-tuning and infrastructure cost reduction. The infrastructure cost is able to be reduced because the appropriate infrastructure that is to be provisioned is identified, and in response to an application using more infrastructure, the application is able to be optimized to reduce the infrastructure cost and forecast.

In at least one embodiment, a method for providing integrated application performance and infrastructure management includes proactively monitoring performance of an application and utilization of provisioned infrastructure for supporting the application, determining at least one of the application is not performing according to application dimensioning information or the provisioned infrastructure is being over utilized, in response to determining the provisioned infrastructure is being over utilized, initiating an adjustment to the provisioned infrastructure to prevent over utilization, in response to determining the application is not performing according to the application dimensioning information, generating an alert indicating the application is not performing according to the application dimensioning information, and in response to the alert, updating the application dimensioning information or adjusting the application to perform according to the application dimensioning information.

In a method according to at least one embodiment, the proactively monitoring performance and the determining at least one of the application is not performing according to the application dimensioning information or the provisioned infrastructure is being over utilized is performed by a proactive monitoring platform, wherein the initiating the adjustment to the provisioned infrastructure to prevent over utilization further comprises sending information about the provisioned infrastructure being over utilized to an application infrastructure provisioning and deployment platform, the application infrastructure provisioning and deployment platform initiating the adjustment to the provisioned infrastructure is performed by the application infrastructure provisioning and deployment platform.

In a method according to at least one embodiment, the generating the alert indicating the application is not performing according to the application dimensioning information is performed by a proactive monitoring platform, the proactive monitoring platform providing the alert to an application management as a service (AMaaS) dashboard, wherein the AMaaS dashboard displays information about the application and the provisioned infrastructure, and in response to receiving the alert, sends feedback information to an application deployment/architecture team for updating the application dimensioning information for the application or adjusting the application to perform according to the application dimensioning information.

In a method according to at least one embodiment, the application dimensioning information is initially defined by an application development/architecture team and provided to a dimensioning management platform and to an application utilization and traffic forecast platform, and wherein the application utilization and traffic forecast platform generates application utilization and traffic forecast data based on the application dimensioning information.

In a method according to at least one embodiment, an application infrastructure provisioning and deployment platform receives the application dimensioning information from the dimensioning management platform and the application utilization and traffic forecast data from the application utilization and traffic forecast platform, and determines the provisioned infrastructure to implement for supporting the application based on the application dimensioning information and the application utilization and traffic forecast data.

In a method according to at least one embodiment, data about the provisioned infrastructure is provided by the application infrastructure provisioning and deployment platform to an actual production traffic and application utilization platform, the actual production traffic and application utilization platform determining production traffic and application utilization using key performance indicators (KPIs) based on the data about the provisioned infrastructure.

In at least one embodiment, the method further includes determining, by a reactive monitoring platform, stability, performance, capacity, and availability data associated with the application and the provisioned infrastructure.

In at least one embodiment, a system for providing integrated application performance and infrastructure management includes a memory storing computer-readable instructions, and a processor connected to the memory, wherein the processor is configured to execute the computer-readable instructions to implement a proactive monitoring platform for proactively monitoring performance of an application and utilization of provisioned infrastructure for supporting the application, determine, by the proactive monitoring platform, at least one of the application not performing according to application dimensioning information or the provisioned infrastructure is being over utilized, implement an application infrastructure provisioning and deployment platform, the application infrastructure provisioning and deployment platform receiving form the proactive monitoring platform information about the provisioned infrastructure being over utilized to initiate an adjustment to the provisioned infrastructure to prevent over utilization, and implement an application management as a service (AMaaS) dashboard, wherein in response to the proactive monitoring platform determining that the application is not performing according to the application dimensioning information, sending, by the proactive monitoring platform, an alert indicating the application is not performing according to the application dimensioning information to the AMaaS dashboard, wherein the AMaaS dashboard generates feedback to update the application dimensioning information or to adjust the application to perform according to the application dimensioning information.

In a system according to at least one embodiment, the processor is further configured to implement a dimensioning platform for receiving the application dimensioning information from an application development/architecture team and to implement an application utilization and traffic forecast platform for receiving the application dimensioning information, the application utilization and traffic forecast platform generating application utilization and traffic forecast data based on the application dimensioning information.

In a system according to at least one embodiment, the application infrastructure provisioning and deployment platform receives the application dimensioning information from a dimensioning management platform and the application utilization and traffic forecast data from the application utilization and traffic forecast platform, the application infrastructure provisioning and deployment platform determining the provisioned infrastructure to implement for supporting the application based on the application dimensioning information and the application utilization and traffic forecast data.

In a system according to at least one embodiment, the processor is further configured to implement an actual production traffic and application utilization platform, wherein the application infrastructure provisioning and deployment platform provides data about the provisioned infrastructure to the actual production traffic and application utilization platform, and wherein the actual production traffic and application utilization platform determines production traffic and application utilization information using key performance indicators (KPIs) based on the data about the provisioned infrastructure.

In a system according to at least one embodiment, the actual production traffic and application utilization platform provides the AMaaS dashboard the production traffic and application utilization information for displaying by the AMaaS dashboard.

In a system according to at least one embodiment, the proactive monitoring platform continuously monitors the performance of the application and the utilization of the provisioned infrastructure to validate the application dimensioning information and the infrastructure provisioning.

In a system according to at least one embodiment, the processor is further configured to implement a reactive monitoring platform for determining stability, performance, capacity, and availability data associated with the application and the provisioned infrastructure.

In at least one embodiment, a non-transitory computer-readable media having computer-readable instructions stored thereon, which when executed by a processor causes the processor to perform operations including proactively monitoring performance of an application and utilization of provisioned infrastructure for supporting the application, determining at least one of the application is not performing according to application dimensioning information or the provisioned infrastructure is being over utilized, in response to determining the provisioned infrastructure is being over utilized, initiating an adjustment to the provisioned infrastructure to prevent over utilization, in response to determining the application is not performing according to the application dimensioning information, generating an alert indicating the application is not performing according to the application dimensioning information, and in response to the alert, updating the application dimensioning information or adjusting the application to perform according to the application dimensioning information.

In a non-transitory computer-readable media according to at least one embodiment, the generating the alert indicating the application is not performing according to the application dimensioning information is performed by a proactive monitoring platform, the proactive monitoring platform providing the alert to an application management as a service (AMaaS) dashboard, wherein the AMaaS dashboard displays information about the application and the provisioned infrastructure, and in response to receiving the alert, sends feedback information to an application deployment/architecture team for updating the application dimensioning information for the application or adjusting the application to perform according to the application dimensioning information.

In a non-transitory computer-readable media according to at least one embodiment, the application dimensioning information is initially defined by an application development/architecture team and provided to a dimensioning management platform and to an application utilization and traffic forecast platform, and wherein the application utilization and traffic forecast platform generates application utilization and traffic forecast data based on the application dimensioning information.

In a non-transitory computer-readable media according to at least one embodiment, an application infrastructure provisioning and deployment platform receives the application dimensioning information from the dimensioning management platform and the application utilization and traffic forecast data from the application utilization and traffic forecast platform, and determines the provisioned infrastructure to implement for supporting the application based on the application dimensioning information and the application utilization and traffic forecast data.

In a non-transitory computer-readable media according to at least one embodiment, data about the provisioned infrastructure is provided by the application infrastructure provisioning and deployment platform to an actual production traffic and application utilization platform, the actual production traffic and application utilization platform determining production traffic and application utilization using key performance indicators (KPIs) based on the data about the provisioned infrastructure.

In at least one embodiment, a non-transitory computer-readable media further includes determining, by a reactive monitoring platform, stability, performance, capacity, and availability data associated with the application and the provisioned infrastructure. Separate instances of these programs can be executed on or distributed across any number of separate computer systems. Thus, although certain steps have been described as being performed by certain devices, software programs, processes, or entities, this need not be the case. A variety of alternative implementations will be understood by those having ordinary skill in the art.

Additionally, those having ordinary skill in the art readily recognize that the techniques described above can be utilized in a variety of devices, environments, and situations. Although the embodiments have been described in language specific to structural features or methodological acts, the subject matter defined in the appended claims is not necessarily limited to the specific features or acts described. Rather, the specific features and acts are disclosed as exemplary forms of implementing the claims.

What is claimed is:

1. A method for providing integrated application performance and infrastructure management, comprising:
    generating, by an application development and architecture team, dimensioning information for supporting an application;
    generating, by an infrastructure deployment and management team, an infrastructure allocation to support the application;
    generating, by an operations and maintenance team, measurements and analysis of processes associated with the application;
    receiving, at an application management as a service (AMaaS) dashboard from the operations and maintenance team, the measurement and analysis of processes associated with the application;
    generating, by the AMaaS dashboard, a feedback signal to the application development and architecture team, the feedback signal establishing continuous feedback signaling between the application development and architecture team, infrastructure deployment and management team, and the operations and maintenance team;
    proactively monitoring performance of an application and utilization of provisioned infrastructure for supporting the application;
    based on the continuous feedback signaling, determining at least one of the application is not performing according to application dimensioning information or the provisioned infrastructure is being over utilized;
    in response to determining the provisioned infrastructure is being over utilized, initiating an adjustment to the provisioned infrastructure to prevent over utilization;
    in response to determining the application is not performing according to the application dimensioning information, generating an alert indicating the application is not performing according to the application dimensioning information; and
    in response to the alert, updating the application dimensioning information or adjusting the application to perform according to the application dimensioning information.

2. The method of claim 1, wherein the proactively monitoring performance and the determining at least one of the application is not performing according to the application dimensioning information or the provisioned infrastructure is being over utilized is performed by a proactive monitoring platform, wherein the initiating the adjustment to the provisioned infrastructure to prevent over utilization further comprises sending information about the provisioned infrastructure being over utilized to an application infrastructure provisioning and deployment platform, the application infrastructure provisioning and deployment platform initiating the adjustment to the provisioned infrastructure is performed by the application infrastructure provisioning and deployment platform.

3. The method of claim 1, wherein the generating the alert indicating the application is not performing according to the application dimensioning information is performed by a proactive monitoring platform, the proactive monitoring platform providing the alert to the AMaaS dashboard, wherein the AMaaS dashboard displays information about the application and the provisioned infrastructure, and in response to receiving the alert, sends the continuous feedback signaling to the application deployment and architecture team for updating the application dimensioning information for the application or adjusting the application to perform according to the application dimensioning information.

4. The method of claim 1, wherein the application dimensioning information is initially defined by the application deployment and architecture team and provided to a dimensioning management platform and to an application utilization and traffic forecast platform, and wherein the application utilization and traffic forecast platform generates application utilization and traffic forecast data based on the application dimensioning information.

5. The method of claim 4, wherein an application infrastructure provisioning and deployment platform receives the application dimensioning information from the dimensioning management platform and the application utilization and traffic forecast data from the application utilization and traffic forecast platform, and determines the provisioned infrastructure to implement for supporting the application based on the application dimensioning information and the application utilization and traffic forecast data.

6. The method of claim 5, wherein data about the provisioned infrastructure is provided by the application infrastructure provisioning and deployment platform to an actual production traffic and application utilization platform, the actual production traffic and application utilization platform determining production traffic and application utilization using key performance indicators (KPIs) based on the data about the provisioned infrastructure.

7. The method of claim 1 further comprises determining, by a reactive monitoring platform, stability, performance, capacity, and availability data associated with the application and the provisioned infrastructure.

8. A system for providing integrated application performance and infrastructure management, wherein the system is configured to:
generate, by an application development and architecture team, dimensioning information for supporting an application;
generate, by an infrastructure deployment and management team, infrastructure allocation to support the application;
generate, by an operations and maintenance team, measurements and analysis of processes associated with the application;
implement an application management as a service (AMaaS) dashboard, the AMaaS dashboard receiving the measurement and analysis of processes associated with the application;
generate, by the AMaaS dashboard, a feedback signal to provide to the application development and architecture team, the feedback signal establishing continuous feedback signaling between the application development and architecture team, infrastructure deployment and management team, and the operations and maintenance team;
based on the continuous feedback signaling, determine, by the proactive monitoring platform, at least one of the application not performing according to application dimensioning information or the provisioned infrastructure is being over utilized;
in response to determining the provisioned infrastructure is being over utilized, initiate an adjustment to the provisioned infrastructure to prevent over utilization;
in response to determining the application is not performing according to the application dimensioning information, generate an alert indicating the application is not performing according to the application dimensioning information; and
in response to the alert, update the application dimensioning information or adjusting the application to perform according to the application dimensioning information.

9. The system of claim 8, further configured to implement a dimensioning platform for receiving the application dimensioning information from the application deployment and architecture team and to implement an application utilization and traffic forecast platform for receiving the application dimensioning information, the application utilization and traffic forecast platform generating application utilization and traffic forecast data based on the application dimensioning information.

10. The system of claim 9, wherein the application infrastructure provisioning and deployment platform receives the application dimensioning information from a dimensioning management platform and the application utilization and traffic forecast data from the application utilization and traffic forecast platform, the application infrastructure provisioning and deployment platform determining the provisioned infrastructure to implement for supporting the application based on the application dimensioning information and the application utilization and traffic forecast data.

11. The system of claim 10, further configured to implement an actual production traffic and application utilization platform, wherein the application infrastructure provisioning and deployment platform provides data about the provisioned infrastructure to the actual production traffic and application utilization platform, and wherein the actual production traffic and application utilization platform determines production traffic and application utilization information using key performance indicators (KPIs) based on the data about the provisioned infrastructure.

12. The system of claim 11, wherein the actual production traffic and application utilization platform provides the AMaaS dashboard the production traffic and application utilization information for displaying by the AMaaS dashboard.

13. The system of claim 8, wherein the proactive monitoring platform continuously monitors the performance of the application and the utilization of the provisioned infrastructure to validate the application dimensioning information and the infrastructure provisioning.

14. The system of claim 8, is further configured to implement a reactive monitoring platform for determining stability, performance, capacity, and availability data associated with the application and the provisioned infrastructure.

15. A non-transitory computer-readable media having computer-readable instructions stored thereon, which when executed by a processor causes the processor to perform operations comprising:
- generating, by an application development and architecture team, dimensioning information for supporting an application;
- generating, by an infrastructure deployment and management team, an infrastructure allocation to support the application;
- generating, by an operations and maintenance team, measurements and analysis of processes associated with the application;
- receiving, at an application management as a service (AMaaS) dashboard from the operations and maintenance team, the measurement and analysis of processes associated with the application;
- generating, by the AMaaS dashboard, a feedback signal to the application development and architecture team, the feedback signal establishing continuous feedback signaling between the application development and architecture team, infrastructure deployment and management team, and the operations and maintenance team;
- proactively monitoring performance of an application and utilization of provisioned infrastructure for supporting the application;
- based on the continuous feedback signaling, determining at least one of the application is not performing according to application dimensioning information or the provisioned infrastructure is being over utilized;
- in response to determining the provisioned infrastructure is being over utilized, initiating an adjustment to the provisioned infrastructure to prevent over utilization;
- in response to determining the application is not performing according to the application dimensioning information, generating an alert indicating the application is not performing according to the application dimensioning information; and
- in response to the alert, updating the application dimensioning information or adjusting the application to perform according to the application dimensioning information.

16. The non-transitory computer-readable media of claim 15 wherein the generating the alert indicating the application is not performing according to the application dimensioning information is performed by a proactive monitoring platform, the proactive monitoring platform providing the alert to the AMaaS dashboard, wherein the AMaaS dashboard displays information about the application and the provisioned infrastructure, and in response to receiving the alert, sends the continuous feedback signaling to the application deployment and architecture team for updating the application dimensioning information for the application or adjusting the application to perform according to the application dimensioning information.

17. The non-transitory computer-readable media of claim 15, wherein the application dimensioning information is initially defined by the application deployment and architecture team and provided to a dimensioning management platform and to an application utilization and traffic forecast platform, and wherein the application utilization and traffic forecast platform generates application utilization and traffic forecast data based on the application dimensioning information.

18. The non-transitory computer-readable media of claim 17, wherein an application infrastructure provisioning and deployment platform receives the application dimensioning information from the dimensioning management platform and the application utilization and traffic forecast data from the application utilization and traffic forecast platform, and determines the provisioned infrastructure to implement for supporting the application based on the application dimensioning information and the application utilization and traffic forecast data.

19. The non-transitory computer-readable media of claim 18, wherein data about the provisioned infrastructure is provided by the application infrastructure provisioning and deployment platform to an actual production traffic and application utilization platform, the actual production traffic and application utilization platform determining production traffic and application utilization using key performance indicators (KPIs) based on the data about the provisioned infrastructure.

20. The non-transitory computer-readable media of claim 15 further comprises determining, by a reactive monitoring platform, stability, performance, capacity, and availability data associated with the application and the provisioned infrastructure.

* * * * *